United States Patent
Dana

[15] 3,662,693
[45] May 16, 1972

[54] METHOD OF MOLDING CANDY IN PLASTIC MOLD

[72] Inventor: Eugene K. Dana, 937-18th St., Santa Monica, Calif. 90404

[22] Filed: Sept. 22, 1970

[21] Appl. No.: 74,383

[52] U.S. Cl.............................264/299, 107/19 C, 99/134 R
[51] Int. Cl.......................................................A23g 3/00
[58] Field of Search...................107/54 R, 19 R, 19 C, 54 F; 99/134, 138, 171 R, 171 CT, 171 LM, 180; 249/111

[56] References Cited

UNITED STATES PATENTS

| | | | |
|---|---|---|---|
| 2,955,044 | 10/1960 | Tupper | 99/180 R X |
| 3,371,626 | 3/1968 | Hachtman | 107/54 F |

FOREIGN PATENTS OR APPLICATIONS

| | | | |
|---|---|---|---|
| 245,980 | 1/1926 | Great Britain | 107/19 C |

*Primary Examiner*—James R. Boler
*Attorney*—Mahoney, Hornbaker & Schick

[57] ABSTRACT

A plastic mold formed of low density polyethylene having a relatively low deformation temperature has an upwardly opening mold cavity preferably with a mold extension extending horizontally from the mold cavity and opening freely horizontally into the cavity. Candy formed of principally sweetening ingredients such as sugar and corn syrup mixtures and the like is heated to approximately 280° F. assuming a hot fluid state, said temperature being in the order of approximately 30° to 100° above the plastic mold deformation temperature. Where the cavity extension is provided, a usual stick is positioned partially in the mold cavity and partially in the cavity extension only part vertically filling the cavity extension and the hot fluid candy is poured into the mold cavity intermediate thereof against a cavity bottom wall spaced from cavity sidewalls. As the hot fluid candy contacts the cavity walls which are at room temperature, a border portion of the candy immediately at least partially solidifies insulating the cavity sidewalls against the remaining hot fluid candy being poured and until all of the candy solidifies thereby preventing deformation of the plastic mold. A similar solidified border is formed by the candy around the stick at the general line between the mold cavity and cavity extension preventing the hot fluid candy from flowing horizontally into the cavity extension despite there being no obstruction between the cavity and cavity extension.

7 Claims, 3 Drawing Figures

PATENTED MAY 16 1972 3,662,693

INVENTOR.
EUGENE K. DANA
BY MAHONEY, HORNBAKER
AND SCHICK
ATTORNEYS

METHOD OF MOLDING CANDY IN PLASTIC MOLD

BACKGROUND OF THE INVENTION

This invention relates to a method of molding candy in plastic molds and more particularly, to a method of molding hot fluid candy and cooling the same to a solidified state in a mold formed of a plastic having a deformation temperature below that of the hot fluid plastic while maintaining the mold against deformation. According to the principles of the present invention, the hot fluid candy at a temperature higher than the deformation temperature of the plastic mold is caused to flow into a cavity of the mold originally at room temperature and during the flowing of the hot fluid candy, a border portion of the candy directly adjacent the mold cavity walls is at least partially solidified to a low heat transfer state so as to form a heat insulation barrier protecting the mold cavity walls against heating sufficiently to raise such walls to their deformation temperature, thereby protecting the plastic mold against deformation during the hot fluid candy flowing and cooling to solidified form.

Prior to the present invention, it has always been the common practice in the candy industry when molding candy formed of materials having relatively high melting temperatures, such as those candies principally formed of sweetening ingredients like sugar and corn syrup mixtures and the like, to use molds formed of either flexible material such as silicone rubber, or metal coated with teflon. In other words, it has always been the practice to make use of molds formed of materials having considerably higher deformation temperatures than the temperatures of the hot fluid candy to be molded in order that the molds being used will not be deformed and the candy will be molded and solidified to the exact shapes desired. Even though these molds commonly used are relatively expensive to provide and particularly where it is required to mold the candy to many different and varied shapes, each requiring different molds, it has never occurred to anyone in the candy industry that molds formed of cheaper materials could be used in view of the relatively high hot fluid candy temperatures involved.

OBJECTS AND SUMMARY OF THE INVENTION

It is, therefore, an object of this invention to provide a method of molding candy in plastic molds wherein the plastic molds may be formed of relatively inexpensive, easily formed plastics having deformation temperatures less than the hot fluid candy to be molded, yet the molding and solidifying of the hot fluid candy may be accomplished without plastic mold deformation. A plastic mold formed of a plastic having a relatively low deformation temperature is positioned with a mold cavity thereof accessible for receiving a flow of hot fluid candy therein, the candy hot fluid temperature being greater than the plastic mold deformation temperature. As the hot fluid candy flows into the mold, the mold originally being at room temperature, an at least partially solidified border is formed in the hot fluid candy adjacent the mold cavity walls with this candy solidified border now being of a low heat transfer state and insulating the mold cavity walls against heating to a temperature above the plastic mold deformation temperature during cooling and solidification of the remainder of the hot fluid candy in the mold cavity.

It is a further object of this invention to provide a method of molding candy in plastic molds following the foregoing procedure, wherein the plastic mold cavity may have a mold extension opening into said mold cavity in which a solid object, such as a conventional stick, may be positioned extending partially into the mold cavity and partially into the cavity extension with the cavity extension opening above the positioned solid object into the mold cavity, yet no barrier is required in the cavity extension around the solid object or thereabove, and the hot fluid candy being molded will not flow beyond the general line of separation between the mold cavity and mold extension. Again, as the hot fluid candy is being poured into the mold cavity, a border portion thereof at least partially solidifies around the solid object at the line of separation between the mold cavity and mold extension, thereby preventing further hot fluid candy from flowing beyond the mold cavity into the mold extension. As a result, obstructing members around the solid object formerly thought to be required for stopping the flow of the hot fluid candy from the mold cavity around the solid object until sufficiently cooled for solidification are completely eliminated so as to still further reduce the candy molding costs.

Other objects and advantages of the invention will be apparent from the following specification and the accompanying drawing which are for the purpose of illustration only.

DESCRIPTION OF THE BEST EMBODIMENTS CONTEMPLATED

Figure 1:
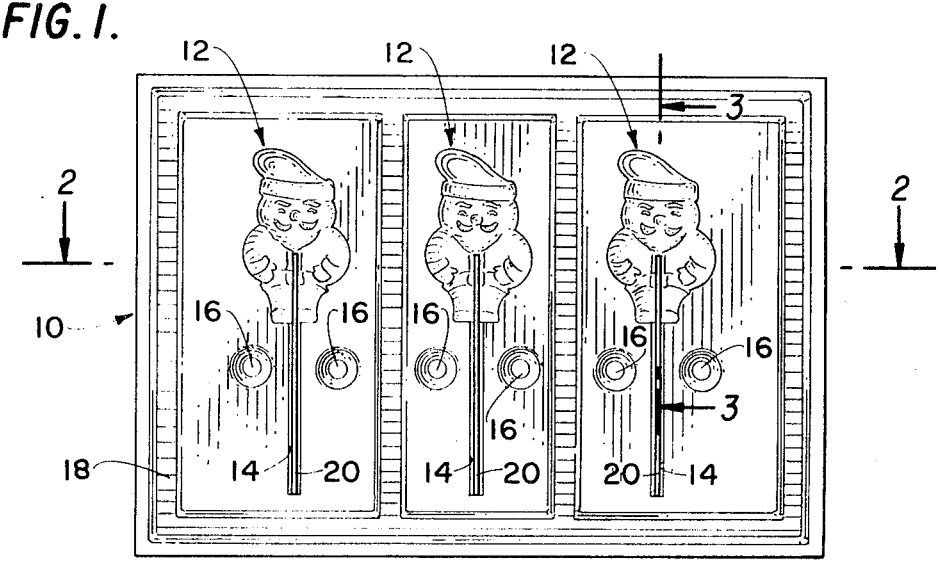
FIG. 1 is a top plan view of an embodiment of plastic mold for carrying out the methods and procedures of the present invention, multiple mold cavities being illustrated having cavity extensions with conventional sticks positioned partially in the mold cavities and partially in the cavity extensions ready for the pouring of hot fluid candy therein.

Referring to the drawings, an embodiment of plastic mold is generally indicated at 10 and includes three, spaced, mold cavities generally indicated at 12 formed of desired final candy configurations and each having an elongated cavity extension 14. The mold cavities 12 open upwardly, as do the cavity extensions 14 so that in molding position, the plastic mold 10 may be positioned flatwise on a horizontal surface with the cavity extensions extending horizontally from the mold cavities and opening horizontally into said mold cavities at the general line of joinder therebetween. Furthermore, in order to maintain the plastic mold 10 level during molding, the plastic mold is provided with downwardly projecting supports 16 spaced beside the cavity extensions 14 and downwardly extending continuous supports 18 around each of the connected mold cavities 12 and cavity extensions 14.

According to the principles of the present invention, the plastic mold 10 is formed totally, and particularly including the walls of the mold cavities 12, of a relatively low deformation temperature plastic, preferably low density polyethylene which is relatively inexpensive and easily formed. The plastic molds 10 may be formed by molding the polyethylene plastic using conventional molding methods.

The candy to be molded is of usual form consisting principally of sweetening ingredients such as sugar and corn syrup mixtures and the like, and has a hot fluid state temperature to which it is heated prior to molding in the order of approximately 280° F. This candy hot fluid state temperature is in the order of at least approximately 30° to 100° F. higher than the relatively low deformation temperature of the low density polyethylene plastic mold 10 which has a continuous resistance to heat of only approximately 180° to 250° F.

Figure 2:
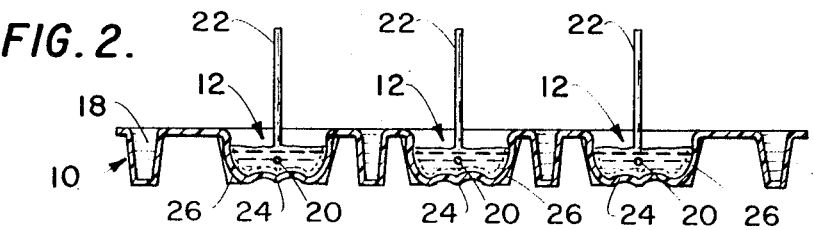
FIG. 2 is a vertical sectional view looking in the direction of the arrows 2—2 in FIG. 1 and with hot fluid candy being poured into the mold cavity.
Figure 3:
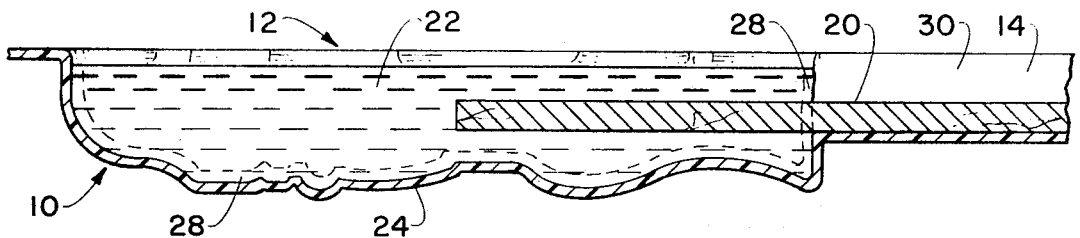
FIG. 3 is an enlarged, fragmentary, vertical sectional view looking in the direction of the arrows 3—3 in FIG. 1 and with the particular mold cavity illustrated filled with candy in the partially solidified state.

In carrying out the methods and procedures of the present invention, the plastic mold 10 is positioned flatwise on a horizontal surface with the mold cavities 12 and cavity extensions 14 opening upwardly and rigid objects such as conventional sticks 20 are positioned downwardly in the mold projecting horizontally partially into the mold cavities and lying the remainder at lower portions of the cavity extensions as shown. The candy is heated to its hot fluid state, such candy in said hot fluid state being indicated at 22 in FIGS. 2 and 3. Furthermore, the hot fluid candy at its hot fluid state temperature is poured and continuously flowed downwardly into the mold cavities 12, the plastic mold 10 and, therefore, the mold cavities at the commencement of pouring of the hot fluid candy being at room temperature.

The pouring of the hot fluid candy 22 is preferably generally central of the mold cavities 12 initially downwardly against bottom walls 24 of the mold cavities and inwardly of sidewalls 26 of the mold cavities. As the hot fluid candy flows against the mold cavity bottom walls 24 and upwardly along the mold cavity sidewall 26, I have surprisingly discovered that the room temperature plastic mold causes the hot fluid candy to at least partially solidify in a border 28 indicated by phantom lines in FIGS. 2 and 3 along said mold cavity bottom and side walls, while said mold cavity bottom and side walls are never heated to a temperature equalling the relatively low deformation temperature of the plastic forming the plastic mold 10. Equally important, I have also surprisingly discovered that the now at least partially solidified border 28 of the hot fluid candy 22 is in a low heat transfer state and forms an insulating barrier against appreciable heat transfer therethrough to the mold cavity bottom and sidewalls 24 and 26 from the remaining hot fluid candy in said mold cavities 12.

Thus, the flowing of the hot fluid candy 22 by pouring the same can proceed on a continuous basis until the mold cavities 12 are filled therewith to the desired level. At all times during such flow of the hot fluid candy 22, the at least partially solidified border 28 is formed as the candy progresses up the mold cavity sidewalls 26 so that the plastic mold 10 is protected by the low heat transfer border against being raised to the plastic deformation temperature throughout said flow or pouring and during cooling and solidifying of the candy. The plastic mold 10 may, therefore, be repeatedly reused and will not deform from the contact with the hot fluid candy 22.

Also during the pouring of the hot fluid candy 22 into the mold cavities 12, and where the cavity extensions 14 are provided, as the mold cavities fill, the hot fluid candy envelopes those portions of the sticks 20 projecting into the mold cavities so that the finished solidified candy has such sticks molded therein. More important, however, and further of surprising discovery, it has been found that as the hot fluid candy 22 rises upwardly around the original room temperature sticks 20, evidently the room temperature of the sticks causes a continuation of the candy at least partially solidified border 28 directly along the general line of separation between the mold cavities 12 and the cavity extensions 14 so as to prevent the still fluid hot fluid candy 22 within the mold cavities from flowing horizontally around the portions of the sticks within the cavity extensions and into open spaces 30 within the mold cavities above the stick. Thus, where the cavity extensions 14 are provided and the sticks 20 are used, the cavity extensions may remain horizontally open into the mold cavities 12 without any obstructions being required to be inserted and the at least partially solidified border 28 will form the necessary barrier between the mold cavities 12 and the cavity extensions 14 for retaining the hot fluid candy 22 totally within the mold cavities until cooled and solidified.

According to the principles of the present invention, therefore, a method of molding candy in plastic molds is provided wherein plastic molds having relatively low deformation temperature plastics forming the same may be used to mold and cool hot fluid candy having a hot fluid temperature above the plastic deformation temperature, yet the plastic molds are not deformed. Furthermore, mold cavities may be used having horizontal cavity extensions opening horizontally into said mold cavities, yet no obstructions or barriers are required at the general line of separation between said mold cavities and cavity extensions, and the hot fluid candy will not flow from the mold cavities into the cavity extensions during the molding and cooling to solidification thereof. As a result, the plastic molds may be formed of relatively inexpensive plastic which is easily formed into mold configurations, the plastic molds may be indefinitely reused despite their inexpensive construction due to the lack of deformation thereof, and the candy molding procedures may be carried out in a minimum expense form.

I claim:

1. In a method of molding high temperature fluid candy in molds formed of low deformation temperature plastic without mold deformation, the steps of: positioning a rigid mold at approximately room temperature and formed of a plastic having a relatively low deformation temperature with a mold cavity thereof accessible for receiving fluid material therein; heating candy to a hot fluid state having a fluid temperature higher than said plastic mold deformation temperature; flowing an initial portion of said heated candy at said higher fluid temperature into said mold cavity; at least partially solidifying to a low heat transfer state a border of said candy initial portion at all mold cavity surfaces contacted during said initial portion flowing by contact of said room temperature mold with said higher fluid temperature candy causing cooling of said solidified candy border contacting said mold cavity surfaces to a temperature below said plastic mold deformation temperature without deformation of said plastic mold; continuing to and completing said flow of said higher fluid temperature heated candy into said mold cavity while continuing said at least partial solidifying to said low heat transfer state said border thereof at all mold cavity surfaces during said continued flowing causing said cooling of said mold cavity surfaces to said temperature below said plastic mold deformation temperature without deformation of said plastic mold; and during and after said flowing of said higher fluid temperature heated candy into said mold cavity, using said solidified border portions of said candy in said low heat transfer state as a heat insultation barrier during cooling and solidifying of all portions of said candy in said mold cavity inward of said border to protect said plastic mold against heating to said plastic mold deformation temperature and prevent deformation of said mold.

2. A method of molding high temperature fluid candy in molds formed of low deformation temperature plastic without mold deformation as defined in claim 1 in which said step of heating said candy includes the heating of said candy to a hot fluid state having a fluid temperature in the order of approximately 30° to 100° higher than said plastic mold deformation temperature.

3. A method of molding high temperature fluid candy in molds formed of low deformation temperature plastic without mold definition as defined in claim 1 in which said step of positioning said rigid mold at approximately room temperature and formed of said plastic having said relatively low deformation temperature includes the positioning of said rigid mold at said approximately room temperature and formed of a low density polyethylene; and in which said step of heating said candy includes the heating of candy formed principally of sweetening ingredients such as sugar and corn syrup mixtures and the like.

4. A method of molding high temperature fluid candy in molds formed of low deformation temperature plastic without mold deformation as defined in claim 1 in which said step of positioning said rigid mold at said approximately room temperature and formed of said plastic having said relatively low deformation includes the positioning of said rigid mold at said approximately room temperature and formed of a low density polyethylene having a relatively low deformation temperature; and in which said step of heating said candy to said hot fluid state includes the forming of said candy principally of sweetening ingredients such as sugar and corn syrup mixtures and the like, and heating said candy to a hot fluid temperature in the order of approximately 30° to 100° higher than said mold deformation temperature.

5. A method of molding high temperature fluid candy in molds formed of low deformation temperature plastic without mold deformation as defined in claim 1 in which said positioning of said rigid mold at said approximately room temperature formed of said plastic having said relatively low deformation temperature with said mold cavity thereof accessible for receiving fluid material therein includes the positioning of said rigid mold at said approximately room temperature formed of said plastic having said relatively low deformation temperature with an upwardly opening mold cavity thereof accessible for pouring fluid material therein; and in which said steps of flowing said initial portion of said heated candy and said continuing to and completing said flow of said heated candy includes the pouring of said heated candy into said mold cavity initially against a mold cavity bottom wall and at all times spaced from mold cavity sidewalls.

6. A method of molding high temperature fluid candy in molds formed of low deformation temperature plastic without mold deformation as defined in claim 1 in which said step of positioning said rigid mold at said approximately room temperature and formed of said plastic having said relatively low deformation temperature with said mold cavity thereof accessible for receiving fluid material therein includes the positioning of said rigid mold at said approximately room temperature and formed of a low density polyethylene plastic having a relatively low deformation temperature with an upwardly open mold cavity thereof accessible for the pouring of fluid material therein; in which said step of heating said candy to said hot fluid state having said fluid temperature higher than said plastic mold deformation temperature includes the forming of said candy principally of sweetening ingredients such as sugar and corn syrup mixtures and the like, and heating said candy to a fluid temperature in the order of approximately 30° to 100° higher than said plastic mold deformation temperature; and in which said steps of flowing said initial portion of said heated candy and said continuing to and completing said flow of said heated candy includes the pouring of said heated candy into said upwardly open mold cavity intermediate said mold cavity and initially against a mold cavity bottom wall and maintaining said heated candy pouring at all times spaced from mold cavity sidewalls.

7. A method of molding high temperature fluid candy in molds formed of low deformation temperature plastic without mold deformation as defined in claim 1 in which said step of positioning said rigid mold at said approximately room temperature formed of said plastic having said relatively low deformation temperature and with said mold cavity thereof accessible for receiving fluid material therein includes the forming of said rigid mold with said mold cavity opening upwardly and having a cavity extension extending horizontally from said mold cavity and opening horizontally freely into said mold cavity, positioning during said mold positioning a solid member extending horizontally partially into said mold cavity and partially into said mold extension with said mold extension opening above said solid member and freely horizontally into said mold cavity above said solid member; and in which said steps of flowing and said solidifying of said heated candy at said candy border includes the pouring of said heated candy into said mold cavity and solidifying said heated candy around said solid member at said heated candy border on a general line of joinder between said mold cavity and said cavity extension without obstruction between said mold cavity and said cavity extension above said solid member and without said heated candy flowing into said cavity extension beyond said joinder general line.

* * * * *